United States Patent
Johnsen et al.

[11] Patent Number: 5,863,586
[45] Date of Patent: Jan. 26, 1999

[54] FEED PRODUCTS AND METHOD FOR PRODUCTION OF SAME

[75] Inventors: Freddy Johnsen, Rånåsfoss; Torbjørn Thorsen, Myre, both of Norway

[73] Assignee: Norsk Hydro a.s, Oslo, Norway

[21] Appl. No.: 658,989

[22] Filed: Jun. 4, 1996

Related U.S. Application Data

[63] Continuation of Ser. No. 376,530, Jan. 23, 1995, abandoned, which is a continuation of Ser. No. 91,193, Jul. 14, 1993, abandoned.

[30] Foreign Application Priority Data

Jul. 15, 1992 [NO] Norway ................................ 922788
Jun. 30, 1993 [NO] Norway ................................ 932386

[51] Int. Cl.$^6$ ........................................................ A23L 1/00
[52] U.S. Cl. .......................... 426/438; 426/98; 426/281; 426/648
[58] Field of Search ................................ 426/438, 648, 426/281, 98

[56] References Cited

U.S. PATENT DOCUMENTS

| | | | |
|---|---|---|---|
| 3,335,015 | 8/1967 | Forkner | 426/438 |
| 3,928,677 | 12/1975 | Anthony | 427/401 |
| 4,729,899 | 3/1988 | Volk et al. | 426/438 |
| 4,861,606 | 8/1989 | Jensen. | |

FOREIGN PATENT DOCUMENTS

| | | | |
|---|---|---|---|
| 9498 | 11/1933 | Australia | 426/438 |
| 167622 | 8/1991 | Norway. | |
| 2232573 | 12/1990 | United Kingdom. | |

*Primary Examiner*—John J. Gallagher
*Attorney, Agent, or Firm*—Wenderoth, Lind & Ponack, L.L.P.

[57] ABSTRACT

The invention provides a new feed product, especially a fish feed product in the form of pellets or particles, with high fat content and superior physical properties. The product is made by immersing feed pellets in a first hot oil bath with a temperature higher than 100° C. to secure drying of and simultaneous fat absorbtion. This treatment is followed by a cooling in a warm oil bath kept at a temperature of 40°–60° C. This completes the fat absorbtion and results in a dry product consisting of hard and smooth particles with high fat content, which are free flowing and do not agglomerate.

9 Claims, 1 Drawing Sheet

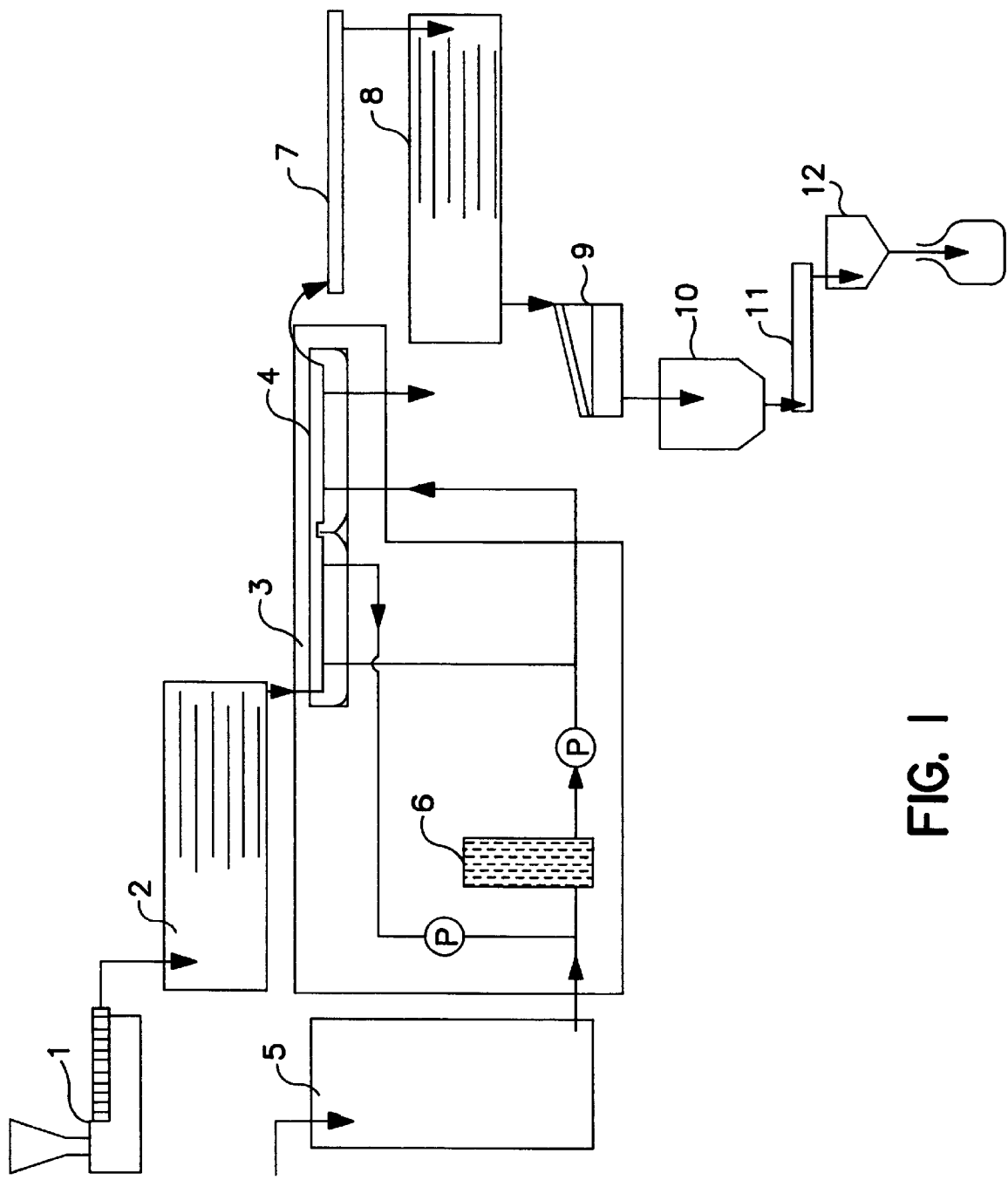
FIG. I

FEED PRODUCTS AND METHOD FOR PRODUCTION OF SAME

This application is a continuation of now abandoned Ser. No. 08/376,530 filed Jan. 23, 1995, which is a continuation of now abandoned Ser. No. 08/091,193 filed Jul. 14, 1993.

This invention relates to extrusion feed products made from ingredients containing proteins, carbohydrates, fats and possibly other additional nutritional elements, vitamins, minerals and preservatives, adhesives, etc.

Such products may be made with the means of a so called extrusion cooker or pressure heat extruder, where the ingredients are added into a common chamber of the extruder and made into a moist mixture of proteins, carbohydrates and fats, etc. The mixture is subjected to mechanical working at elevated temperatures and pressures and is thereafter extruded through an extrusion die into the atmosphere at ambient pressure.

As the hot and pressurized material emerges through the holes in the extrusion die, it expands into a porous product due to the pressure drop across the die and the flashing off of water as steam. The extrudate is then cut into pieces of desired length and dried. A complete production line for production of such products can be divided into a number of single process steps or stages using known equipment units which together make up the production plant. These steps will normally be weighing, pregrinding, mixing, heating, extrusion, cutting, drying, cooling and a final coating before packing into bags or containers.

What is making extrusion technology special is the use of water and the employment of high kneading forces, temperatures and pressure within the extruder chamber. Hereby is obtained a homogenous product which is cut into small pieces forming pellets with special physical properties. But such a technique allows a maximum fat content of 20–22% in the extrudate, depending on the extruder's heat and pressure characteristics and the amount of fat in the raw materials used, if the resulting pellets shall have acceptable physical properties.

From U.S Pat. No. 4,454,804 Mac Telloc, there is known a method and apparatus for incorporating higher amounts of fats and oils. For this purpose the extruder is provided with an elongated tubular extrusion die, mounted adjacent the dye orifice and in which the material remains under prolonged elevated pressure and temperature. Additional fat or oil is injected into the centre of the hot, pressurized mix as it passes through the tubular extrusion die, through an injection nozzle mounted concentrically within the tubular die; so that the fat additives are deposited from within. As the material is extruded from the tubular die into the atmosphere under normal pressure the superheated moisture partially flashes off to cause the material to expand forming a porous structure. As the material expands, the fat additive permeates throughout the porous structure, from the centre towards the surface thereof. The expanded extrudate is then cut into pieces of a desired size and is cooled and dried to further reduce the moisture content of the product. The injection nozzle is mounted concentrically within the cylindrical wall of the tubular extrusion die, at or near the upstream end of the tubular die adjacent to the die orifice.

Such an arrangement is, however, interfering with the extrusion process and when the extrusion die is made up with a number of extrusion orifices of smaller diameter, it is virtually impossible to control the amounts of liquid fat to each orifice. The arrangement of a second or third fat coating step after the primary fat addition will not improve on this.

Also when excess fat is added to the feed mixture in the extruder chamber, the fat has a tendency to be separated from the ingredient mix and to reduce the mixing forces.

Attempts to add substantial amounts of fat directly to the ingredient mixture prior to the extrusion will result in products having wet, sloppy and greasy properties. So far there are therefore no commercial methods available for producing extruded feed products with a very high percentage of fats and oil of 24–30% or higher.

Thus, it is an object of the invention to provide a method for production of extruded pellets with a wider range of fat avoiding the drawbacks of the high fat content giving a sloppy and greasy product.

Another object of the invention is to provide a method for production of extruded pellets with a wider range of fat avoiding degradation of the oil used in the process.

Furthermore, it is an object of this invention to provide a product with improved physical and biological properties.

Finally, it is an object of the invention to provide conditions which permit water or moisture to be evaporated from and fat to be absorbed in a feed product simultaneously in one and the same treatment step to obtain a feed product with low moisture content and high fat content and superior physical properties.

These and other objects of the invention are obtained with the special method as described below in connection with the drawing according to FIG. 1, which is a schematic view of a process line incorporating the equipment needed to carry out the method to produce an extruded product according to the invention.

The present invention will be described in detail hereafter in connection with the use of extrusion technology for the production of special fish feed granules with a high content of fat. It is to be understood that the present description is a description of a preferred embodiment of the method and the apparatus used and that there may be made several modifications regarding treatment times and temperatures as well as production and drying/heating equipment.

After leaving the extruder section 1, the expanded pellets containing about; 15–30% water, are introduced into a first oil bath, being heated to a temperature of 120° C. The feed pellets might be dried under controlled conditions in a conventional dryer 2 before introduced to the first oil bath. The hot oil is situated in a shallow vessel 3 having an oil depth of 20 cm. The underside of the vessel 3 is heated by a special heater with means for uniformly controlling the temperature. A second cooling, oil bath at 50° C. contained in a special vessel 4 of corresponding form and depth as used in the first treatment step, is used as a second treatment step. Hot pellets of 9 mm diameter are transported by a chute into the first vessel 3 with hot oil at 120° C. The pellets are transported through the baths without intermediate storage with a residence time of 2 minutes in each bath. The temperature in the second oil bath was kept at 50° C. Thereafter the pellets are led by conveyor 7 to a cooler 8, passed to a screen 9 and thereafter left for temporary storage in a bin 10. The product is weighed out in portions by a scale 11 and finally bagged in a bagging unit 12.

There are separate transport systems for each oil bath. These systems are provided with a continuously variable drive so that the speed through each bath as well as the treatment time may be controlled. While the first oil heating bath is provided with a heater means the second oil bath is provided with cooling means. Oil is supplied from an oil tank 5 with fresh oil and is preheated in a heat exchanger 6 before being fed to the vessels 3 and 4.

The overflow of oil from the vessels is collected and returned to the heat exchanger. Fresh oil to replace the oil absorbed in the product is supplied from the tank 5 and a mixture of fresh and used oil is fed to the vessels 3 and 4. The amount of oil to be fed is determined by monitoring the oil level in the two vessels, keeping it between a predetermined upper and lower limit.

During the treatment steps the temperature is continuously monitored and controlled. The resulting pellets were of excellent quality having a hard and smooth outer surface, preventing agglomeration of individual pellets, and a total fat content of 35% by weight, based on dry weight. The treatment time can be adjusted by varying the speed of transportation of the pellets. Oil which is used and removed from the oil bath is replenished by controlling the oil level and adding oil to keep the oil level within the desired upper and lower level.

The above method represents a combined drying and coating procedure whose first step is essentially characterized in that feed is immersed in a hot oil bath at temperatures above 100° C., preferably 120°–140° C. This results in an immediate drying, because remaining moisture in the product is evaporated while liquid fat is gradually filling up the empty spaces in the product left by the evaporated water.

However, the optimal fat absorption is not obtained in this step, even if the treatment time is increased until the system is in an apparent equilibrium. This can be explained by the high vapour pressure within the product, which pressure will be reduced when cooling the product further during the second treatment step. This is carried out in a subsequent oil bath kept at a temperature below 100° C., preferably 40°–60° C. This results in a significantly increased fat absorption in this second stage, which is also an essential part of the present invention.

As illustrated in the following examples complete fat absorbtion can be obtained with treatment times of one minute. The treatment times will generally be between 0.75–5 minutes and preferably between 1–4 minutes.

The oil used in the baths is as described in the following:

| Kind of oil | Fish oils or oil mixtures |
| --- | --- |
| Free fatty acids, % | <10 |
| Tot. ox. (2 × peroxide value + anisidine value) | <40 |
| Water and air, % | <1 |
| EPA + DHA, % | 13–30 |

Degradation of the oil in the first oil bath is avoided as oxidation products like anisidine and particularly peroxides are removed together with evaporated water from the extruded feed products. The removal of these oxidation products is causing an even better quality than the fresh one added from the oil tank 5 for the oil remaining in the oil bath. In this way feed oils not having the best quality might be used. This is a favourable feature of the method according to the invention, as the working expenses of the process might be reduced.

There have been carried out a number of laboratory and pilot scale tests to determine the critical variables of the present method.

EXAMPLE 1

According to this example we have investigated the critical parameters in step 1, the combined drying and fat absorbtion step. The results are given in table 1 below.

In table 1 we have recorded the fat absorption in % in relation to treatment at various temperatures (110°–140° C.) and treatment times (1, 2, 3 and 4 minutes) and with varying product diameters of 6 and 9 mm.

TABLE 1

Results Example 1

|  | % Fat in end product | Fat absorption bath 1 | Fat absorption bath 2 |
| --- | --- | --- | --- |
| Temp. bath 1 |  |  |  |
| 110 (6 mm) | 30.9 | 20.5 | 3.4 |
| 120 (6 mm) | 31.5 | 20.0 | 4.5 |
| 110 (9 mm) | 29.5 | 18.7 | 3.8 |
| 120 (9 mm) | 30.7 | 19.2 | 4.5 |
| 140 (9 mm) | 32.5 | 19.0 | 6.5 |
| Time (min) bath 1 |  |  |  |
| 1 minute | 29.3 | 18.5 | 3.8 |
| 2 minutes | 30.2 | 19.5 | 3.8 |
| 3 minutes | 31.8 | 20.0 | 4.8 |
| 4 minutes | 32.6 | 20.0 | 5.6 |

The absorption of fat is satisfactory within the given treatment times and the temperatures. Increasing treatment times above 4 minutes and increasing temperature above 140° C. seemingly have no significant effect on the fat absorption.

EXAMPLE 2

We have also carried out more detailed drying and absorption tests where the effects of varying the conditions in the second treatment step also were investigated. These tests confirm the results obtained initially and are reported in table 2 below.

By varying the treatment times and the temperatures in step 1 as well as step 2, maximum fat absorption in the second treatment step is easily obtainable within the temperatures and within the treatment periods described. However, prolonged treatment at higher temperatures in stage 1 will decrease the total water content. Even if this has no significant implications for the fat absorption, it may be of value in connection with establishing optimal physical properties of the feed product. The results illustrate that the temperature and treatment time in the first step have great influence for the water content in the end product which can be lowered to 6 to 7% when starting with an extruded product containing up to 18% water.

The final fat content is determined by the degree of drying after the product leaves the extruder and by the amount of extra fat absorbed during step 2. A low water content results in a higher fat absorption. The times and the temperatures used in step 1 and step 2 are well within acceptable limits. Perfectly acceptable product characteristics will be obtained keeping the temperature between 40°–60° C. and the treatment time between 1–4 minutes in step 2. (Table 2)

TABLE 2

Results Example 2.

| Diameter | Temp. bath 1 | Temp. bath 2 | Time bath 1 | Time bath 2 | Water % out from extruder | % Fat bath 1 | Water % bath 1 | % Fat bath 2 | Water % bath 2 |
|---|---|---|---|---|---|---|---|---|---|
| 6 | 110 | 40 | 2 | 1 | 17.4 | 26.7 | 12.6 | 29.8 | 12.0 |
| 6 | 110 | 40 | 3 | 2 | 17.6 | 27.4 | 10.6 | 30.9 | 9.9 |
| 6 | 110 | 40 | 4 | 3 | 17.6 | 28.4 | 9.7 | 31.9 | 9.1 |
| 6 | 120 | 50 | 1 | 1 | 18.1 | 25.2 | 12.1 | 27.9 | 11.9 |
| 6 | 120 | 50 | 2 | 2 | 18.0 | 26.8 | 10.2 | 30.8 | 9.7 |
| 6 | 120 | 50 | 3 | 3 | 17.9 | 27.9 | 8.1 | 32.3 | 7.7 |
| 6 | 120 | 50 | 4 | 4 | 17.9 | 28.2 | 6.8 | 34.9 | 6.2 |
| 9 | 110 | 50 | 1 | 1 | 17.2 | 25 | 13.8 | 28.6 | 12.6 |
| 9 | 110 | 50 | 2 | 2 | 17.6 | 25.7 | 13 | 28.9 | 12.7 |
| 9 | 110 | 50 | 4 | 4 | 17.6 | 26.3 | 12.3 | 30.9 | 11.3 |
| 9 | 120 | 50 | 1 | 1 | 17.9 | 26.5 | 13.2 | 28.6 | 12.1 |
| 9 | 120 | 50 | 2 | 2 | 17.9 | 26.5 | 10.9 | 29.1 | 10.4 |
| 9 | 120 | 50 | 3 | 3 | 17.8 | 26.7 | 8.7 | 31.4 | 8.5 |
| 9 | 120 | 50 | 4 | 4 | 17.8 | 26.0 | 7.9 | 32.5 | 7.0 |
| 9 | 140 | 60 | 1 | 1 | 18.0 | 25.4 | 9.5 | 32 | 8.9 |
| 9 | 140 | 60 | 2 | 2 | 17.9 | 26.6 | 7 | 32.6 | 6.8 |
| 9 | 140 | 60 | 3 | 3 | 18.0 | 26.1 | 6.5 | 32.7 | 6.4 |
| 9 | 140 | 60 | 4 | 4 | 17.8 | 25.9 | 4.3 | 32.8 | 4.1 |

EXAMPLE 3

To evaluate the effects of varying particle diameters and degree of expansion after extrusion, pilot scale tests were carried out. The results are shown in the table 3.

TABLE 3

Results Example 3

| Measured | Normal expansion | Large expansion |
|---|---|---|
| Temp. 1 | 120° C. | 120° C. |
| Temp. 2 | 50° C. | 50° C. |
| Time 1 | 4 min. | 4 min. |
| Time 2 | 4 min. | 4 min. |
| Diameter uncoated (mm) | 6.6 | 6.9 |
| Diameter coated (mm) | 6.4 | 6.6 |
| Fat % | 34.3 | 37.8 |
| Water % | 4.8 | 7.2 |

When the diameter is increased from 6.6 to 6.9 mm the fat content will increase from 34.3 to 37.8%. The water content was only 4.8% by normal expansion and 7.2% by the highest expansion of the product. These results indicate that a greater degree of expansion of the product after extrusion results in a higher absorption of fat. A lower water content in the extruded product will increase the fat absorbtion further. Even with fat contents of 37.8% the particles are still having an acceptable hardness and good physical properties.

EXAMPLE 4

A number of analyses of the oil in the first bath were performed to evaluate the quality of the oil.

Poly-unsaturated fatty acids which are present in the oil, are unstable under the influence of oxygen, temperature and light. Oxidation reactions may occur and cause deterioration of the oil.

The ratio between pellets and oil in bath 1 was 1:10. Bath 1 was containing 2 kg oil at temperature 140 ° C., and 0.2 kg pellets were introduced for 2 minutes. 2 minutes later absorbed fat was replaced by 40 g oil (140° C.) from bath 2. This procedure was repeated for 3 hours the first day. The oil was then cooled. The next day the process was repeated for 4 more hours.

In Table 4 analyses of para-anisidine value (p-AV), peroxide value (POV), free fatty acids (FFA), polymers, isomer (Trans), conjugated double bonds (conj.dbb.), and total oxidation at different time intervals are shown.

TABLE 4

Results Example 4.

| Time | p-AV | POV | FFA (%) | Polymers | Trans | Conj. dbb. | TOTOX |
|---|---|---|---|---|---|---|---|
| start, day 1 | 17,5 | 5,1 | 3,7 | 0,2 | N.D.* | 0,6 | 27,7 |
| 10 min. | 25,2 | 1,5 | 3,8 | | | | 28,2 |
| 20 min. | 23,1 | 1,6 | 3,9 | | | | 26,3 |
| 30 min. | 22,4 | 1,6 | 3,8 | | | | 25,6 |
| 40 min. | 19,5 | 1,2 | 3,9 | | | | 21,9 |
| 50 min. | 19,9 | 1,3 | 4,0 | | | | 22,5 |
| 60 min. | 15,3 | 1,2 | 3,8 | 0,4 | N.D.* | 0,6 | 17,7 |
| 80 min. | 13,5 | 0,9 | 4,1 | | | | 15,3 |
| 100 min. | 11,0 | 0,7 | 4,3 | | | | 12,4 |
| 120 min. | 9,7 | 0,8 | 4,4 | | | | 11,3 |
| 180 min. | 10,3 | 1,0 | 4,2 | 0,6 | N.D.* | 0,6 | 12,3 |
| start, day 2 | 11,0 | 1,6 | 4,3 | | | | 14,2 |
| 1 hour | 12,8 | 0,8 | 4,4 | | | | 14,4 |
| 2 hours | 11,0 | 1,0 | 4,2 | | | | 13,0 |
| 3 hours | 11,7 | 1,0 | 4,0 | | | | 13,7 |
| 4 hours | 10,1 | 1,1 | 4,7 | 0,3 | N.D.* | 0,7 | 12,3 |

(*not detectable)

Table 4 shows that the total oxidation of oil is considerably reduced which means that the quality of the feed oil in the first oil bath is improved. Particularly, the peroxide value is quickly reduced to a sufficiently lower amount.

There have also been carried out extended storage tests to test the quality of the products. The results were compared with standard feed products made by extrusion technology. The storage time was 4 weeks.

The results of prolonged storage of the new product were comparable with the standard products. There was not observed any negative effects relating to the quality of the fat.

From the results obtained during pilot scale production it can be concluded that the new production method has provided the possibility to combine drying and fat coating to obtain superior feed products of high fat content. This has provided a higher fat content than with any other known technology, and even with these high fat contents it is possible to provide a unique new product with improved physical and biological properties.

The invention provides a method for preparing feed products of high fat content, where the oil used is not degraded during the process but rather yields improved quality.

The process can be run in a continuous way giving fully reproducible end results. The products are stable and can be stored for a long time.

We claim:

1. Method for the production of fish feed products having high fat content and improved physical properties, which comprises mixing proteins, carbohydrates and fat with one or more additional feed components together in the presence of moisture under application of high mixing forces, heat and pressure and thereafter subjecting the resultant mixture to pelletizing, eventually drying and cooling, after which the feed is subjected to additional treatment steps comprising immersion into a hot oil bath at a temperature above 100° C. and is kept immersed until a substantial amount of water present is evaporated and a substantial amount of the hot oil has penetrated into open pores or voids created by the evaporated water, and where the oil quality is improved by removal of peroxides and other oxidation products from the oil together with the evaporated water, whereafter the product is transferred to a second oil bath having a temperature below 100° C. to complete the oil absorption and to obtain a stabilized end product with a high fat content, said additional treatments steps being conducted in a continuous manner, to produce a fish feed product having a fat content of 30% or higher.

2. Method for the production of feed products according to claim 1, characterized in that the temperature in the first oil bath is kept between 100° C. and 140° C. and the temperature in the second oil bath is kept between 40° C. and 60° C.

3. Method for the production of feed products according to claim 1, characterized in that the treatment time in the first oil bath is kept between 1 and 4 minutes and the treatment time in the second oil bath is also kept between 1 and 4 minutes.

4. Feed product produced according to the method of claim 1, characterized in that the end product is in the form of individual particles or pellets with a fat content of 30% or higher, having a smooth and hard surface layer preventing agglomeration of the individual particles or pellets.

5. Method for the production of feed products according to claim 2, characterized in that the treatment time in the first oil bath is kept between 1 and 4 minutes and the treatment time in the second oil bath is also kept between 1 and 4 minutes.

6. Feed product produced according to claim 2, characterized in that the end product is in the form of individual particles or pellets with a fat content of 30% or higher, having a smooth and hard surface layer preventing agglomeration of the individual particles or pellets.

7. Feed product produced according to claim 3, characterized in that the end product is in the form of individual particles or pellets with a fat content of 30% or higher, having a smooth and hard surface layer preventing agglomeration of the individual particles or pellets.

8. Method for the production of feed products according to claim 1, characterized in that the oil in the hot oil bath and the second oil bath is a fish oil.

9. Method for the production of feed products according to claim 1, characterized in that the additional feed components are selected from the group consisting of minerals, vitamins, preservatives and adhesives.

* * * * *